US012279101B2

(12) United States Patent
Huang

(10) Patent No.: US 12,279,101 B2
(45) Date of Patent: Apr. 15, 2025

(54) ULTRA-SLIM FORCE-CANCELING SPEAKER STRUCTURE

(71) Applicant: Dell Products L.P., Round Rock, TX (US)

(72) Inventor: Paul Huang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 226 days.

(21) Appl. No.: 17/974,729

(22) Filed: Oct. 27, 2022

(65) Prior Publication Data

US 2024/0147156 A1 May 2, 2024

(51) Int. Cl.
*H04R 7/06* (2006.01)

(52) U.S. Cl.
CPC .................................... *H04R 7/06* (2013.01)

(58) Field of Classification Search
CPC ........................................ H04R 7/06
USPC ........................................ 381/182
See application file for complete search history.

(56) References Cited

U.S. PATENT DOCUMENTS

| | | | | | |
|---|---|---|---|---|---|
| 3,393,764 | A * | 7/1968 | Schafer | H04R 1/227 | 381/89 |
| 6,212,284 | B1 * | 4/2001 | Puls | H04R 9/06 | 381/345 |
| 6,711,274 | B2 * | 3/2004 | Asahina | H04M 1/03 | 381/345 |
| 8,948,423 | B2 * | 2/2015 | Kim | H04R 1/24 | 381/396 |
| 2002/0168074 | A1 * | 11/2002 | Miyamoto | H04R 9/10 | 381/182 |
| 2005/0271226 | A1 * | 12/2005 | Tanabu | H04R 9/063 | 381/396 |
| 2009/0112339 | A1 | 4/2009 | Huang et al. | | |
| 2021/0306756 | A1 | 9/2021 | Huang et al. | | |
| 2022/0238091 | A1 | 7/2022 | Jasleen et al. | | |

* cited by examiner

*Primary Examiner* — Suhan Ni
(74) *Attorney, Agent, or Firm* — Larson Newman, LLP

(57) ABSTRACT

A speaker includes a first transducer assembly and a second transducer assembly arranged in opposite to each other, wherein the first transducer assembly includes a first diaphragm, and the second transducer assembly includes a second diaphragm. A magnet assembly having a set of primary magnets and a secondary magnet that are asymmetrically arranged and disposed between the first diaphragm and the second diaphragm.

20 Claims, 7 Drawing Sheets

ULTRA-SLIM FORCE-CANCELING SPEAKER STRUCTURE

FIELD OF THE DISCLOSURE

The present disclosure generally relates to information handling systems, and more particularly relates to an ultra-slim force-canceling speaker structure.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A speaker includes a first transducer assembly and a second transducer assembly arranged in opposite to each other, wherein the first transducer assembly includes a first diaphragm, and the second transducer assembly includes a second diaphragm. A magnet assembly having a set of primary magnets and a secondary magnet that are asymmetrically arranged and disposed between the first diaphragm and the second diaphragm.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
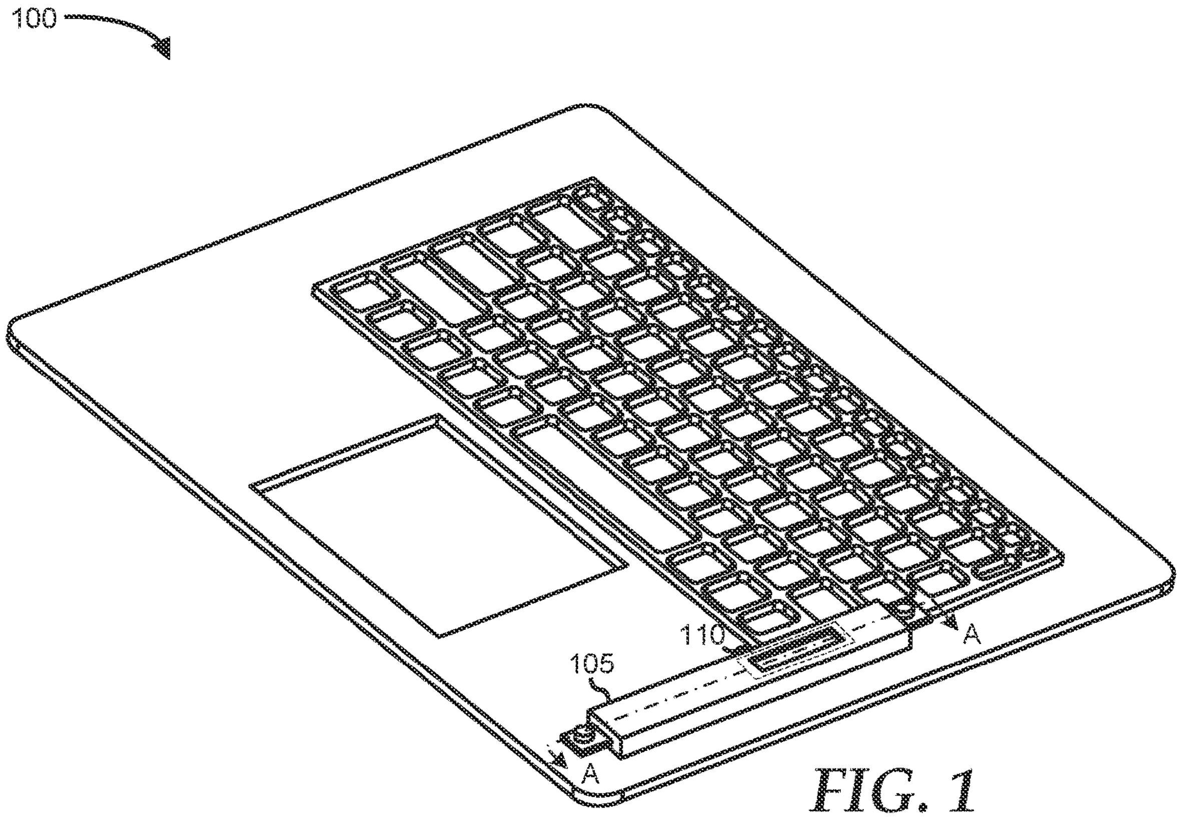
FIG. 1 is a perspective view of a c-cover housing a mounted speaker enclosure according to an embodiment of the present disclosure.
Figure 2:
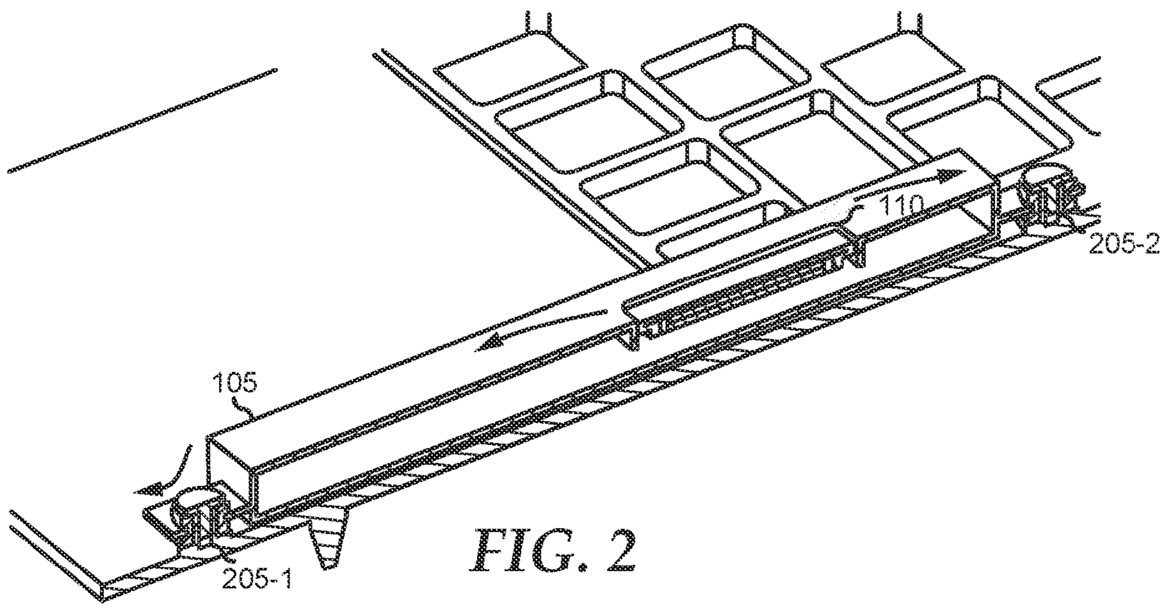
FIG. 2 is a partial perspective view of a cross-section of a mounted speaker enclosure, according to an embodiment of the present disclosure.

FIG. 1 shows a c-cover 100 housing a mounted speaker enclosure. The speaker enclosure includes a speaker box 105 and a speaker 110. FIG. 2 depicts a sectional view of the mounted speaker enclosure taken along line A-A. In this example, the mounted speaker enclosure is mounted on c-cover 100 at least by screws 205-1 and 205-2. The arrows depict the vibrations generated by a transducer assembly. The vibrations are transmitted into the speaker enclosure and further into the c-cover 100 through the mounting structures, such as screws 205-1-205-2.

Some portable information handling systems, such as laptops, notebooks, or tablets, include an audio system to provide audio content to a user of the computing device. The audio system typically includes speakers, such as electromagnetic speakers with a voice coil and magnets. With these speakers, an unbalanced inertial force is the primary cause of the rattling or buzzing noise that usually leads to an unpleasant user experience. In addition to the buzzing noise, the palm rest area may also vibrate while the speaker is playing. This vibration is based on the force generated by the speaker in producing the sound which is transmitted to the speaker enclosure. If the speaker enclosure cannot resist the force, the vibration will be transmitted to the chassis of the portable information handling system through its mounting structures. As the result, the whole structure of the portable information handling system may vibrate and rattle.

Conventional force-canceling speakers include dual-sided diaphragms which can effectively reduce the force when the diaphragms vibrate. Because the speaker includes two identical transducers to achieve the force-canceling feature, these force-canceling speakers are typically twice in height or thickness as traditional speakers. However, portable information handling systems continue to shrink in size and increase in capability. Users appreciate smaller portable systems without sacrificing any functionality. The decreasing sizes of portable information handling system resulted from a confluence of factors; one driving factor is the shrinking size of display panels and their thickness. Once a user selects a display size, the user typically can select a particular portable information handling system based on processing capability and thickness. Generally, users prefer portable information handling systems that have thinner profiles which tend to have less room for various components, such as speakers. Accordingly, to address these and other concerns, the present disclosure provides a structure for an ultra-slim force-canceling speaker which provides the benefits of the conventional force-canceling speaker with less height. Thus, the ultra-slim force-canceling speaker in the present disclosure can be accommodated by the thinner profiles of the portable information handling systems.

Figure 3:
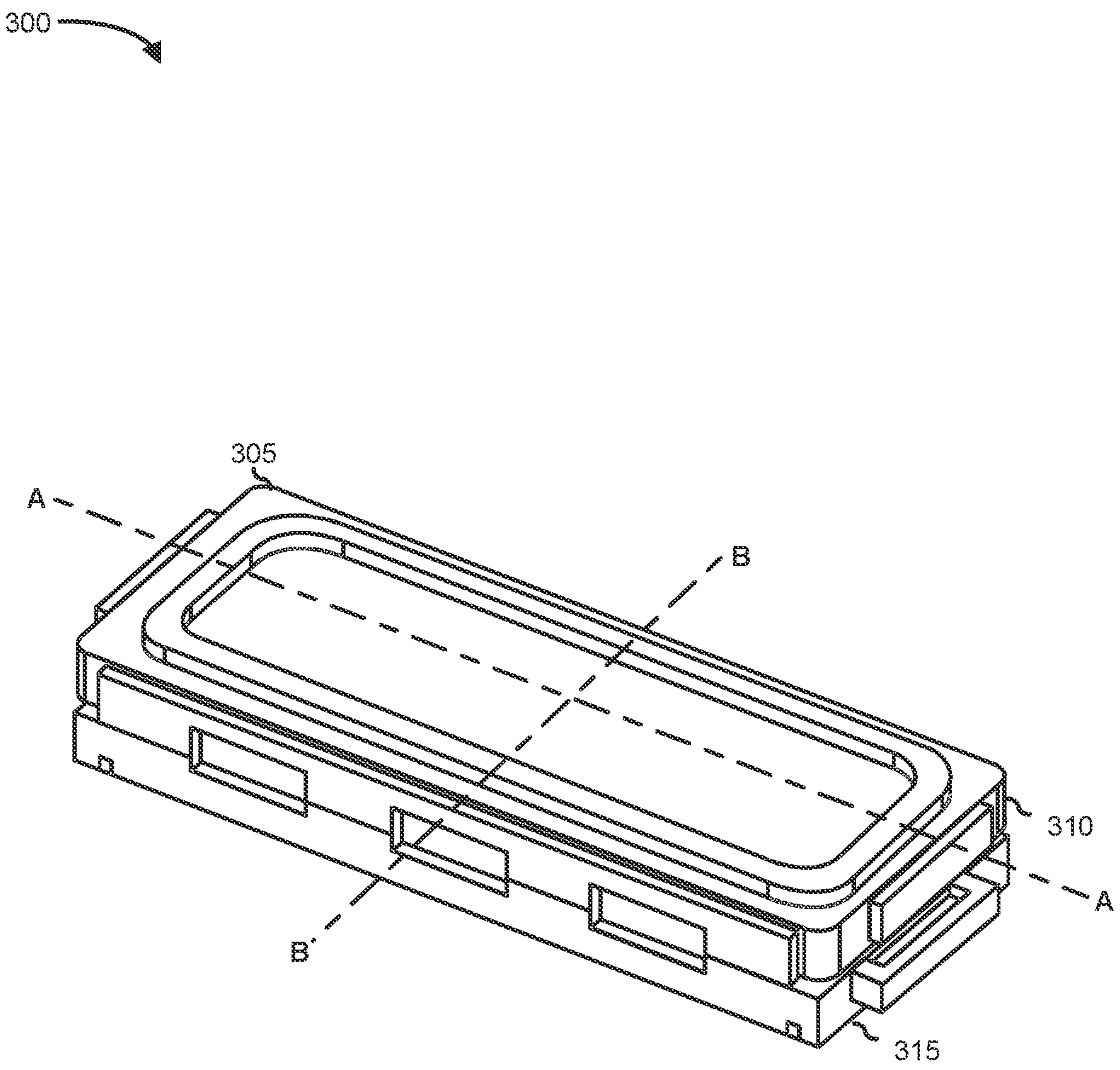
FIG. 3 is a perspective view of a force-canceling speaker, according to an embodiment of the present disclosure.

FIG. 3 shows a structure of a speaker 300, which is an ultra-slim force-canceling speaker. Similar to speaker 110, speaker 300 may be placed in speaker box 105. However, because of the ultra-slim design of speaker 300, the height of speaker box 105 may be reduced resulting in a thinner portable information handling system even if speaker 300 includes dual-sided transducer assemblies of opposing diaphragms. For example, speaker 300 includes a symmetrical pair of opposing diaphragms and voice coils with a magnet assembly in between that is supported by a yoke. However, speaker 300 adapts a magnetic assembly with an asymmetrical structure in contrast to the typical symmetrical structure of the magnetic assembly of conventional force-canceling speakers.

Because of the asymmetrical structure of the magnet assembly, speaker 300 is thinner than conventional force-canceling speakers while producing symmetrical magnetic fields of equal force. In one example, a conventional force-canceling speaker may be six millimeters in height while speaker 300 may be four and a half millimeters in height which is twenty-five percent thinner. In addition, the asymmetrically arranged magnets of the magnetic assembly form different magnetic paths that move in opposite directions which provide in-phase forces or acoustic outputs. That is, when the transducers begin to operate, each diaphragm will move in the opposite direction and produce opposite forces. Due to the symmetric magnetic fields, these two opposing forces are equal and will consequently cancel each other resulting in a zero net force.

Figure 4:
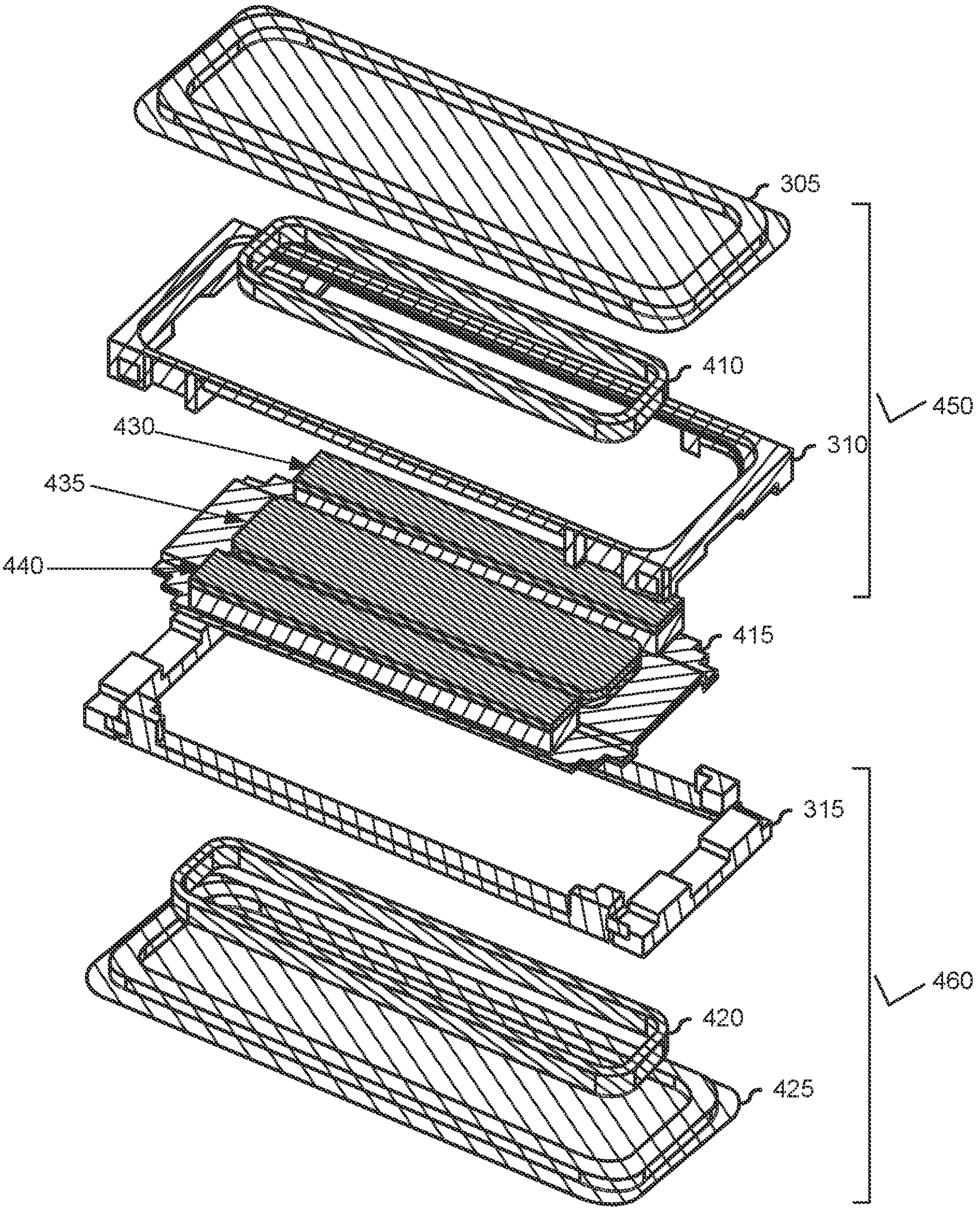
FIG. 4 is an exploded perspective view of a force-canceling speaker, according to an embodiment of the present disclosure.

FIG. 4 shows an exploded view of speaker 300 which is an ultra-slim force-canceling speaker. Speaker 300 includes transducers 450 and 460. Transducer 450 includes diaphragm 305 and a voice coil 410 that is attached to frame 310. Transducer 460 includes a diaphragm 425 and a voice coil 420 that is attached to frame 315. Further, each voice coil is attached to its associated diaphragm. As shown herein, diaphragm 305 may face the opposite direction from diaphragm 425. Speaker 300 also includes a magnet assembly 415 between the two transducers or diaphragms. Magnet assembly 415 includes multiple magnets arranged around a yoke. For example, magnet assembly 415 includes a set of primary magnets and a secondary magnet. The magnets may be supported by pole pieces, such as a side pole piece 430, a center pole piece 435, and a side pole piece 440.

Figure 5:
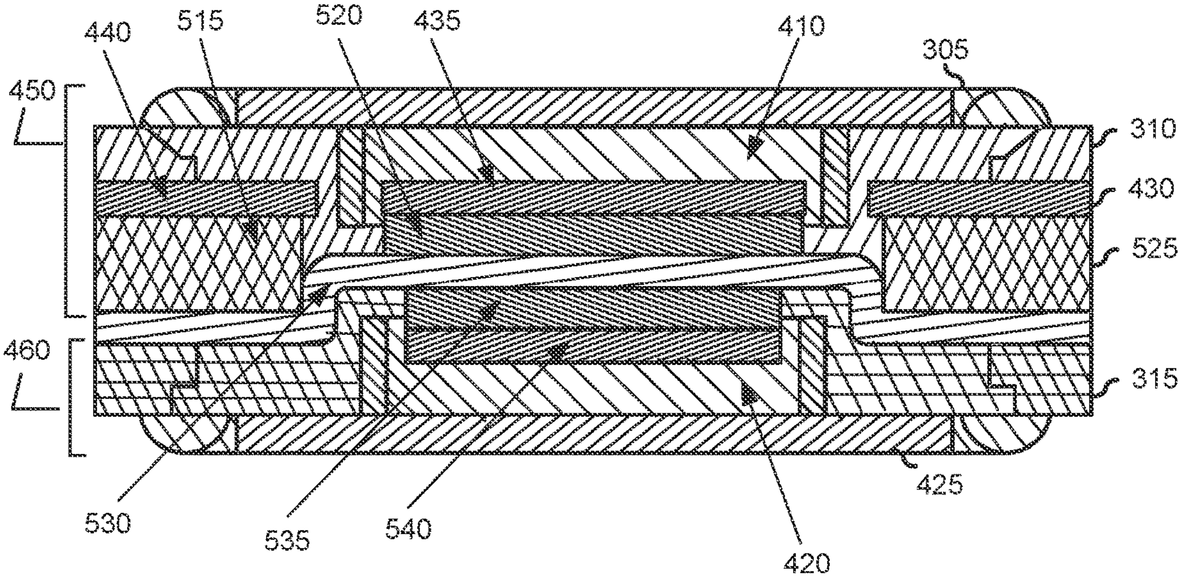
FIG. 5 is a cross-sectional view of a force-canceling speaker, according to an embodiment of the present disclosure.

FIG. 5 depicts a sectional view of speaker 300 enclosure taken along line B-B. In this example, speaker 300 includes dual transducers 450 and 460 which are sharing a yoke 530. As stated above, transducer 450 includes diaphragm 305 and voice coil 410 that are attached to frame 310. While transducer 460 includes diaphragm 425 and voice coil 420 that are attached to frame 315. Center pole piece 435 is disposed between voice coil 410 and primary center magnet 520. While pole piece 540 is disposed between voice coil 420 and secondary magnet 535. Primary center magnet 520 and secondary magnet 535 are disposed on either side of yoke 530.

Primary side magnet 515 is disposed between side pole piece 440 and portion of yoke 530. Side pole piece 440 may be attached to a portion of frame 310 providing support to primary side magnet 515. Similarly, primary side magnet 525 is disposed between side pole piece 430 and a portion of yoke 530. Side pole piece 430 may also be attached to another portion of frame 310. For example, side pole piece 440 may be attached to a left portion of frame 310 while side pole piece 430 may be attached to a right portion of frame 310. Secondary magnet 535 may be disposed between yoke 530 and pole piece 540, wherein yoke 530 may be coupled to frame 315. Yoke 530 may also be coupled to frame 310. Yoke 530 may be a rigid non-magnetic structure that provides support to the magnets and/or connect the magnet assembly to the frames of speaker 300.

The pole pieces, which may be rigid or semi-rigid non-magnetic structures, may be used to provide additional support by attaching the magnets to the yoke and/or the frames. For example, side pole piece 440 may be used to attach primary side magnet 515 to frame 310 while side pole piece 430 may be used to attach the primary side magnet 525 to frame 310. Center pole piece 435 may be used to attach primary center magnet 520 to voice coil 410 and/or frame 310 while pole piece 540 may be used to attach secondary magnet 535 to voice coil 420 and/or frame 315. In other words, center pole piece 435 may support primary center magnet 520 while side pole piece 440 may support primary side magnet 515, and side pole piece 430 may support primary side magnet 525. Accordingly, pole piece 540 may support secondary magnet 535.

Figure 6:
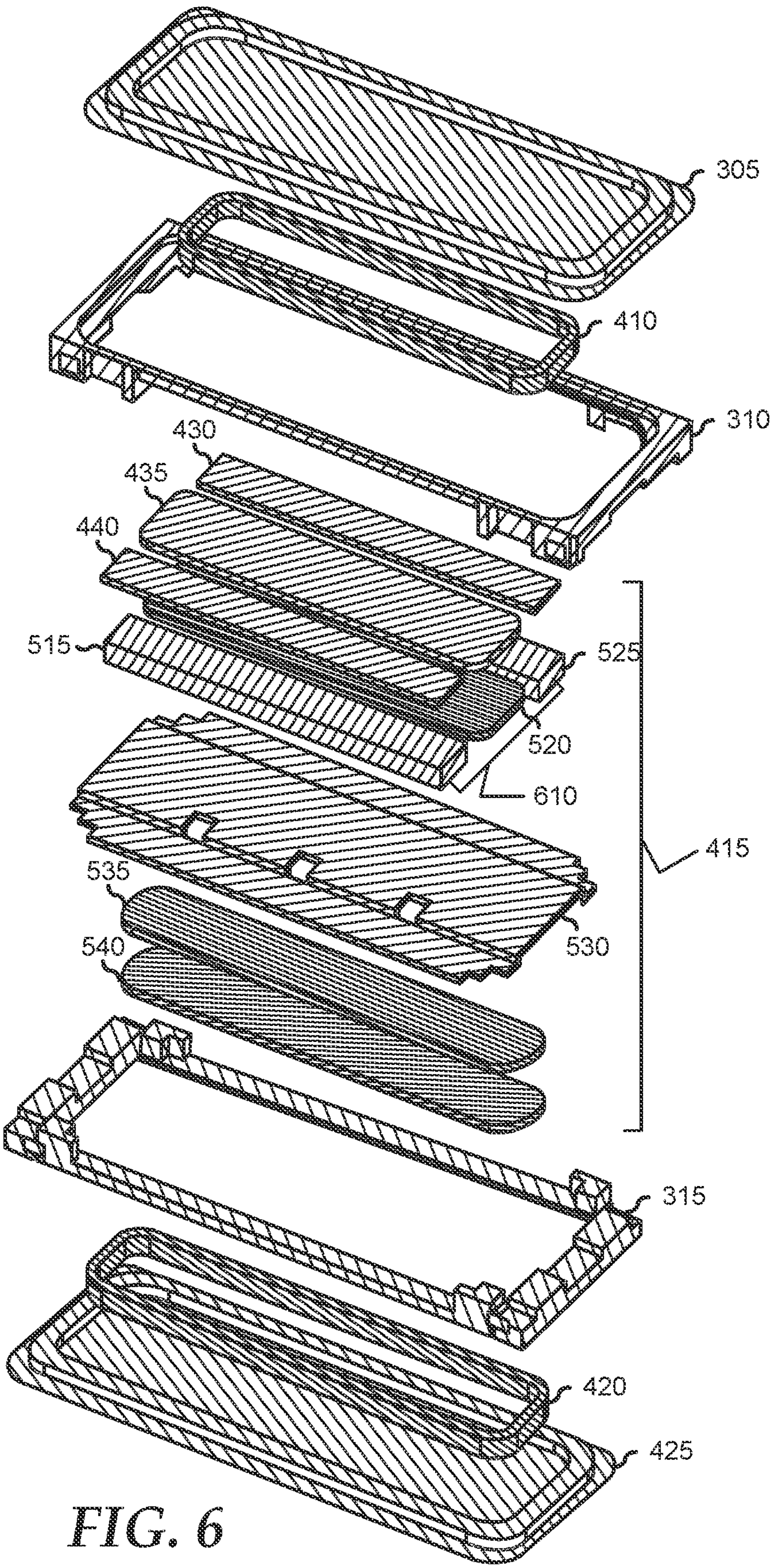
FIG. 6 is an exploded view of a force-canceling speaker, according to an embodiment of the present disclosure.

FIG. 6 shows an exploded view of speaker 300 and magnet assembly 415. Magnet assembly 415 includes side pole piece 430, center pole piece 435, and side pole piece 440. Magnet assembly 415 also includes a set of primary magnets 610 and secondary magnet 535 that are arranged asymmetrically on each side of yoke 530. The set of primary magnets 610 includes three magnets such as primary side magnet 525, primary center magnet 520, and primary side magnet 515 on one side of yoke 530 while secondary magnet 535 is on the other side of the yoke along with pole piece 540. Due to the asymmetrical arrangement of the magnets, the configuration of the magnets on each yoke is different.

The primary side magnets 525 and 515 may be of the same size and grade and are disposed of on each side of the primary center magnet 520. The primary side magnets are positioned such that they may increase the magnetism of primary center magnet 520 which is smaller and has less magnetism than secondary magnet 535. For example, primary side magnet 525 may be on one side or primary center magnet 520 while primary side magnet 515 may be disposed on the other side of primary center magnet 520. Each of primary side magnets 525 and 515 may be smaller than primary center magnet 520. However, when combined the primary side magnets may be of the same size as the primary center magnet.

In addition, the combined magnetism of the primary side magnets and the primary center magnet may be greater than the magnetism of the secondary magnet. To achieve equal magnetic forces, the magnetism of the secondary magnet may be increased by adjusting the length of the wire used in the voice coils. For example, the wire used for voice coil 420 which is associated with secondary magnet 535 may be longer than the wire used for voice coil 410 which is associated with primary center magnet 520. As such, voice coil 420 may be bigger or longer than voice coil 410 as depicted in FIG. 11. Accordingly, the magnetism associated with the set of primary magnets and the secondary magnet may be equal resulting in equal magnetic forces on both sides of the yoke. As a result, when diaphragm 605 and diaphragm 425 may vibrate equal forces on both sides cancel each of the forces out.

Figure 7:
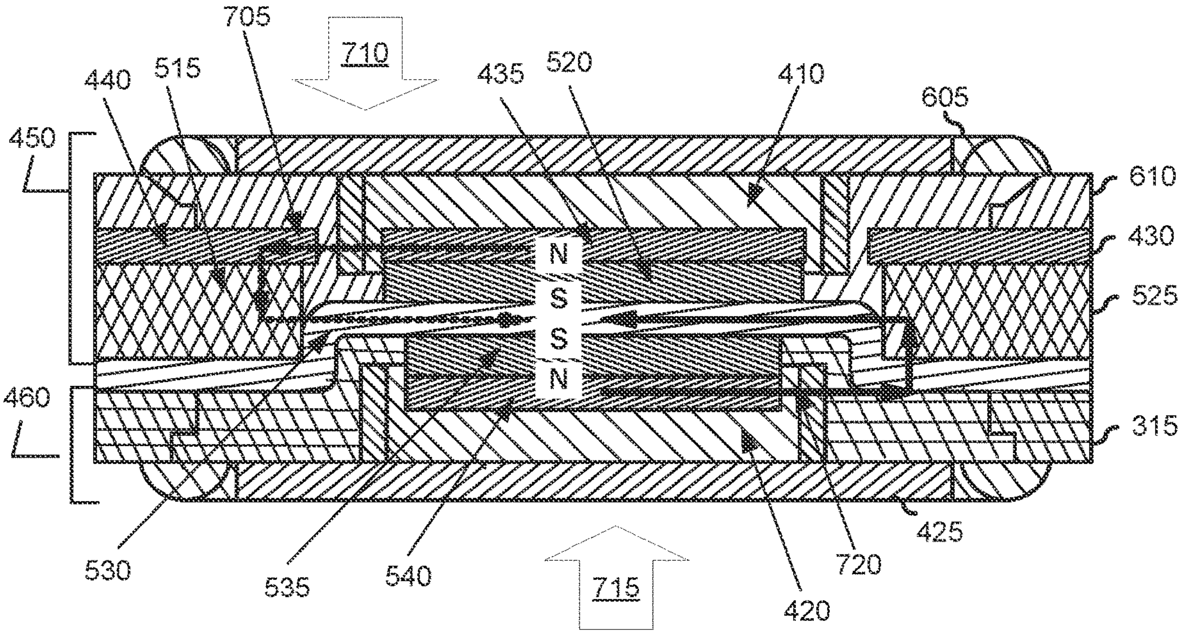
FIG. 7 is a cross-sectional view of a force-canceling speaker, according to an embodiment of the present disclosure.

FIG. 7 shows a sectional view of speaker 300 enclosure taken along line B-B. The sectional view also shows the magnetic return paths of the transducers. The force canceling transducers can be viewed as two speakers with magnets that are asymmetrically positioned and axially aligned. Each transducer has its own symmetrical magnetic return path on each side of yoke 530 as depicted by magnetic return paths 705 and 720. These magnetic return paths drive the movement of the voice coils and/or diaphragms. Accordingly, each diaphragm can move in opposite directions to cancel out the forces. Here, transducer 450 has a magnetic return path 705 moving in the opposite direction of magnetic return path 720 of transducer 460.

As shown, magnetic return path 705 traverses along primary center magnet 520 towards the center of the magnet assembly via primary side magnet 515. Because the polarity of primary center magnet is 530 is opposite to the polarity of secondary magnet 535, magnetic return path 720 traverses in the opposite direction along secondary magnet 535 towards the center of the magnet assembly via primary side magnet 525. The magnetic fields created by transducers 450 and 460 create symmetric magnetic fields which in turn result in equal magnetic forces to move each diaphragm. The dual forces, which are the sound waves, cancel each other out and result in "no net force" due to the two diaphragms moving in opposite directions. Here, diaphragm 605 moves in the direction of arrow 710 while diaphragm 425 moves in the direction of arrow 715.

Figure 8:
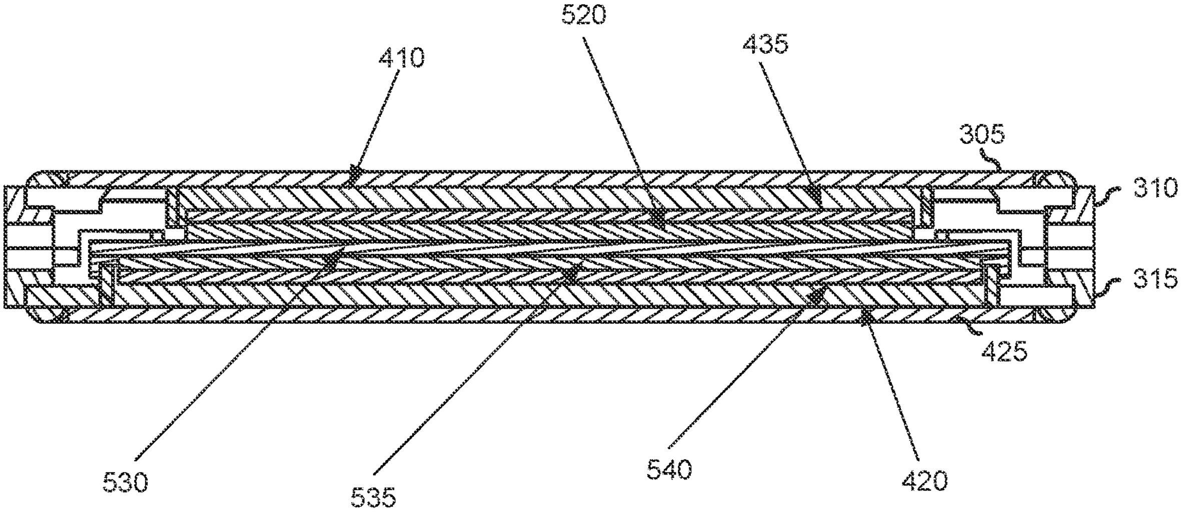
FIG. 8 is a cross-sectional view of a force-canceling speaker, according to an embodiment of the present disclosure.

FIG. 8 shows a sectional view of speaker 300 enclosure taken along line A-A. Although secondary magnet 535 may be bigger as depicted or of a higher grade than primary center magnet 520, the total magnetic force of secondary magnet 535 may still be less than the magnetic force of primary center magnet 520. To compensate, voice coil 420 may be bigger than voice coil 410. The bigger voice coil may have a magnetic force that can be used to match the magnetic force of secondary magnet 535. Accordingly, the smaller voice coil may be used to match the magnetic force of the primary center magnet 520. Thus, the magnetic forces generated may be substantially equal.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A speaker comprising:

a first transducer assembly and a second transducer assembly arranged in opposite to each other, wherein the first transducer assembly includes a first diaphragm, and the second transducer assembly includes a second diaphragm; and a magnet assembly having a set of primary magnets and a secondary magnet that are asymmetrically arranged and disposed between the first diaphragm and the second diaphragm, wherein the set of primary magnets includes a primary center magnet, a first primary side magnet, and a second primary side magnet, and wherein the first primary side magnet, the primary center magnet, and the second primary side magnet are each supported by a first pole, a center pole, and a second pole respectively.

2. The speaker of claim 1, wherein the a first polarity of the set of primary magnets is opposite a second polarity of the secondary magnet.

3. The speaker of claim 2, wherein the secondary magnet is bigger than the primary center magnet.

4. The speaker of claim 2, wherein the secondary magnet is higher grade than the primary center magnet.

5. The speaker of claim 2, wherein the first primary side magnet is disposed on a first side of the primary center magnet and the second primary side magnet is disposed on a second side of the primary center magnet.

6. The speaker of claim 2, wherein the primary center magnet and the secondary magnet are disposed on opposite sides of a yoke.

7. The speaker of claim 1, wherein a first magnetism associated with the set of primary magnets is equal in magnetic force to a second magnetism associated with the secondary magnet.

8. The speaker of claim 1, wherein the first transducer assembly further includes a first voice coil and the second transducer assembly further includes a second voice coil, wherein a first length of a first wire used for the first voice coil is shorter than a second length of a second wire used for the second voice coil.

9. A speaker comprising:

a first transducer assembly and a second transducer assembly arranged in opposite to each other, wherein the first transducer assembly includes a first diaphragm, and the second transducer assembly includes a second diaphragm; and a magnet assembly having a set of primary magnets and a secondary magnet that are asymmetrically arranged against a yoke and disposed between the first diaphragm and the second diaphragm, wherein the set of primary magnets includes a primary center magnet, a first primary side magnet, and a second primary side magnet, and wherein the first primary side magnet, the primary center magnet, and the second primary side magnet are each supported by a first pole, a center pole, and a second pole respectively.

10. The speaker of claim 9, a first polarity of the set of primary magnets is opposite a second polarity of the secondary magnet.

11. The speaker of claim 10, wherein the secondary magnet is bigger than the primary center magnet.

12. The speaker of claim 10, wherein the first primary side magnet is disposed on a first side of the primary center magnet and the second primary side magnet is disposed on a second side of the primary center magnet.

13. The speaker of claim 10, wherein the primary center magnet and the secondary magnet are disposed on opposite sides of the yoke.

14. The speaker of claim 10, wherein the first transducer assembly further includes a first voice coil and the second transducer assembly further includes a second voice coil, wherein a first length of a first wire used for the first voice coil is shorter than a length of a second wire used for the second voice coil.

15. The speaker of claim 9, wherein a first magnetism associated with the set of primary magnets is equal in magnetic force to a second magnetism associated with the secondary magnet.

16. A speaker comprising:

a first transducer assembly and a second transducer assembly arranged in opposite to each other, wherein the first transducer assembly includes a first diaphragm, and the second transducer assembly includes a second diaphragm; and a magnet assembly having a plurality of magnets that are asymmetrically arranged and disposed between the first diaphragm and the second diaphragm, wherein the magnets include a first set of primary magnets and a secondary magnet, and wherein a first magnetism associated with the first set of primary magnets is equal in magnetic force to a second magnetism associated with the secondary magnet.

17. The speaker of claim 16, wherein the magnets include a primary center magnet and the secondary magnet opposite each other on a yoke.

18. The speaker of claim 16, wherein the magnets include at least two magnets having opposite polarities.

19. The speaker of claim 16, wherein the magnets include a first magnet and a second magnet, wherein the second magnet is bigger than the first magnet.

20. The speaker of claim 16, wherein the a first polarity of the first set of primary magnets is opposite a second polarity of the secondary magnet.

* * * * *